June 19, 1962 C. E. MYERS 3,039,304
RAIN GAUGE
Filed March 31, 1960

INVENTOR
CHARLES E. MYERS
Williamson, Schroeder & Palmatier
ATTORNEYS

United States Patent Office 3,039,304
Patented June 19, 1962

3,039,304
RAIN GAUGE
Charles E. Myers, 100 N. Broadway, Albert Lea, Minn.
Filed Mar. 31, 1960, Ser. No. 18,959
3 Claims. (Cl. 73—171)

This invention relates to rain gauges, and more specifically relates to rain gauges of the type for use in home-owners' gardens and yards.

Although various types of rain gauges have been known in the past, they have been substantially a single-purpose type of unit and full usage of such rain gauges has not been obtained.

An object of my invention is to provide a new and improved rain gauge of simple and inexpensive construction and operation.

Another object of my invention is to provide a new and improved rain gauge which is well adapted for performing multiple functions including measuring of rain and measuring the quantity of water sprinkled onto a lawn or garden area.

Still another object of my invention is to provide a new and improved rain gauge which may be readily and easily moved from one location to another in the garden or yard area for use in measuring rainfall and the amount of water being sprinkled onto a certain area and also facilitating the ready and easy emptying of the rain gauge when sprinkling is completed without necessitating removal or transplanting of the rain gauge from its desired location.

These and other objects and advantages of my invention will more fully appear from the following description made in connection with the accompanying drawings wherein like reference characters refer to the same or similar parts throughout the several views and in which.

Figure 1:
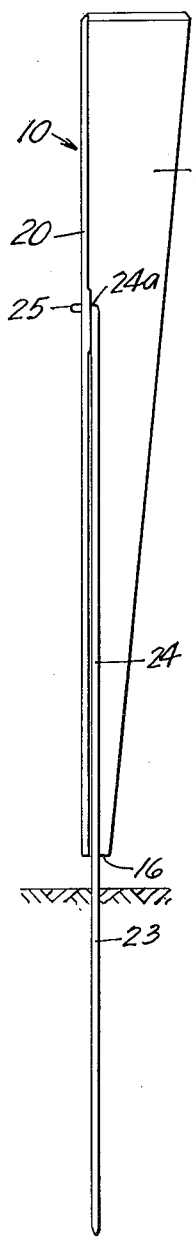
FIG. 1 is a side elevation view of the invention.

One form of the present invention is shown in the drawings and is described herein. The rain gauge is indicated in general by numeral 10 and includes an elongate, upright receptacle 11 constructed of rigid material and may be produced by injection molding or the like.

The left and right sidewalls 12 and 13 may be parallel with each other, and the front and rear walls 14 and 15 are convergently oriented with respect to each other in a downward direction so as to give the receptacle 11, an overall wedge shape with a flat bottom 16. The upper peripheral edges 17 of the receptacle walls are beveled to a knife-like edge, and a non-linear scale 18 may be impressed on the front wall 14 so that the amount of rainfall may be easily checked. At least one of the walls of the receptacle, and preferably more than one, is transparent so that the level of the water may be observed through the wall.

Figure 4:
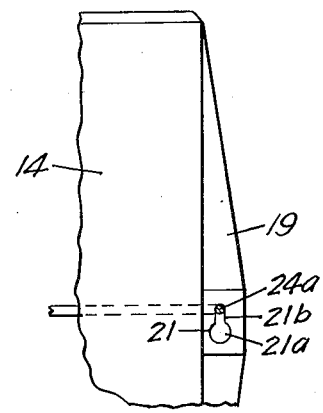
FIG. 4 is a detail front elevation view with a portion of the invention shown in section.

It will be noted that the receptacle 11 is provided with a pair of rigid webs 19 and 20 respectively disposed at the opposite sides of the receptacle, and positioned to essentially comprise extensions of the rear wall 15 and lying in the same plane with the rear wall. The webs 19 and 20 extend to the lowermost portion of the receptacle, and are provided, intermediate the ends thereof and at a position spaced well above the bottom of the receptacle, with a pair of keyhole-shaped apertures 21 and 22 which are identical in shape with respect to each other, and one of which is shown in detail in FIG. 4. It will be seen that the enlarged lower portion 21a communicates with the upwardly extending slot-like portion 21b and that the opposite sides of the slot portion 21b are parallel with each other.

The rain gauge 10 is provided with a mounting 23 for the receptacle 11 and said mounting comprises an elongate rod capable of limited resilient flexing formed into substantially a U-shape and having a pair of depending and downwardly convergent legs 24 and an intermediate portion 25. The intermediate portion 25 normally lies against the outer surface of the rear wall 15 of the receptacle and the upper terminal end portions 24a of the legs 24 lie in a common horizontal plane with the intermediate portion 25 and extend in tight-fitting relation through the upper slot portions 21b of the apertures 21 so as to be firmly held therein. It will be noted that the apertures 21 are positioned in slightly spaced relation with the sidewalls 12 and 13 of the receptacle, so as to permit the legs 24 to be normally in linear condition but in convergent relation with each other and inwardly bearing and gripping relation with the lower portions of the sidewalls 12 and 13 of the receptacle. It is to be particularly noted that the lower portions 24b of the legs 24 continue to converge with each other at a position beneath the bottom of the receptacle.

Figure 2:
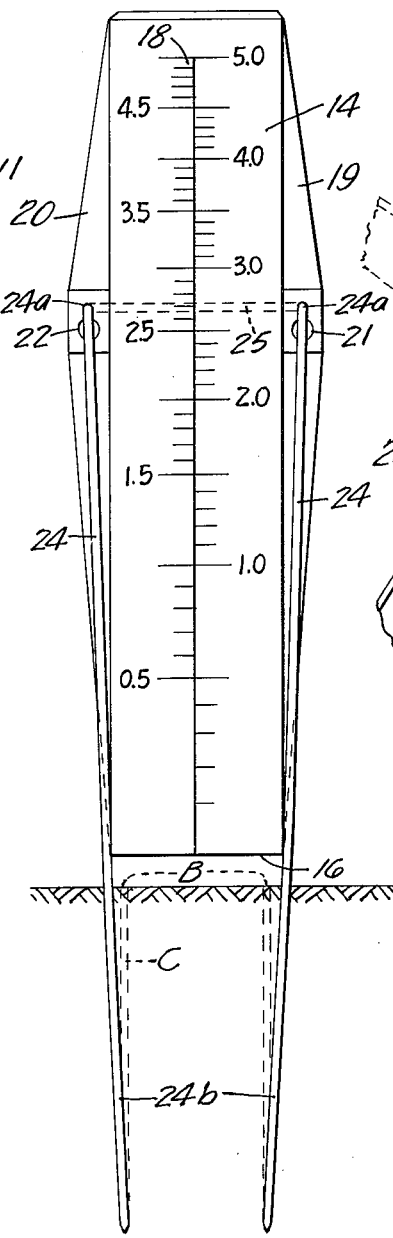
FIG. 2 is a front elevation view of the invention.

When these lowermost portions 24b of the legs are projected into the ground, they will first engage the ground surface at approximately the positions B shown in FIG. 2 and as the lower ends of the legs are moved downwardly into the ground, they may follow a path shown by the broken lines C, or in certain instances may even converge further. In any event, the soil will bear firmly against the lower portions 24b so as to urge them inwardly and thereby the legs 24 will clamp tightly against the receptacle sidewalls in gripping relation. Because of this gripping relation and the snug fitting between the upper terminal portions 24a and the slot portions 21b of the apertures, the receptacle 11 and mounting 23 form a substantially rigid unit.

It will be understood that the rain gauge may be placed at any desired position in the lawn so as to receive rain in an open and unsheltered location. Alternately, the unit may be located in the lawn within the area being wetted by a sprinkler so as to receive water being sprayed by the sprinkler and thereby measure the quantity of water, in inches, being sprinkled onto the lawn.

Figure 3:
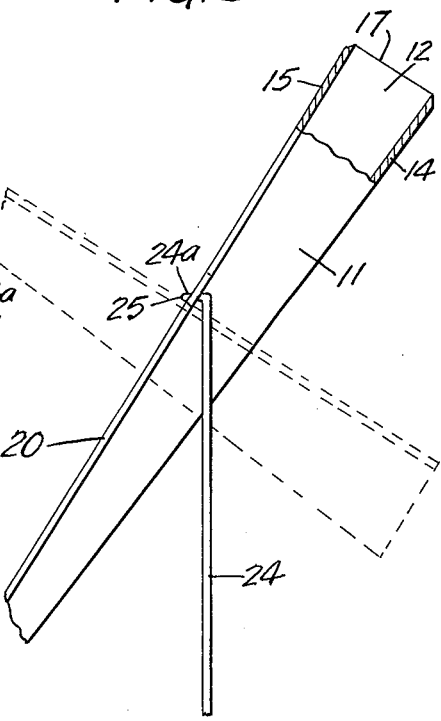
FIG. 3 is a detail side elevation view, partly in section and showing the invention in various stages of its use.

When a quantity of water has been collected in the receptacle 11 the receptacle may be dumped without necessitating removal of the legs from the ground, as is illustrated in FIG. 3, wherein the receptacle is manually tipped forwardly so as to extract the lowermost portion of the receptacle from the grip of the legs 24, and this swinging movement will cause the upper terminal portions 24a of the legs to be extracted from the slot portions 21a of the apertures, whereupon, the receptacle is free to swing into the dotted line position shown in FIG. 3.

When the water has been emptied from the receptacle, it may be swung back into the position shown in FIGS. 1 and 2 and by a slight pressure on the top of the receptacle, the upper terminal portions 24a of the legs will again slip into the slot-like portions 21a of the apertures, and the gauge will thereupon be ready for receiving an additional quantity of rain to be measured.

It will, of course, be understood that various changes may be made in the form, detail, arrangement and proportion of the parts without departing from the scope of my invention which consists of the matter described herein and set forth in the appended claims.

What I claim is:

1. A rain gauge comprising an elongate upright receptacle having an open top and having a pair of outwardly projecting rigid webs respectively disposed in upright positions at opposite sides of the receptacle, said webs having apertures spaced upwardly from the lower end of the receptacle and also spaced outwardly from the sides of the receptacle, a mounting including a generally U-shaped elongate, resilient rod capable of limited flexing and having a pair of downwardly extending downwardly convergent legs lying generally in a plane and bearing snugly against the sides of the receptacle and extending downwardly therebeyond for projection into the ground, said rod also having an upper bight portion interconnecting said legs, the upper terminal portions of said legs being bent at an angle and extending through said apertures, whereby the receptacle is normally gripped and held in upright position by the legs projecting into the ground, and the receptacle may be tilted for emptying without removing said legs from the ground.

2. A rain gauge comprising an elongate upright receptacle having an open top, front and rear walls converging with each other in a downward direction, and opposite parallel sides having horizontal bottom edges, and said receptacle also having a pair of outwardly projecting rigid webs oriented in an upright position and disposed at opposite sides of the receptacle, said webs extending substantially to the bottom of the receptacle, said webs also having apertures disposed intermediate the upper and lower ends of the receptacle and also spaced outwardly from the sides of the receptacle, a mounting including a generally U-shaped elongate resilient rod having legs and an intermediate portion, said intermediate portion extending generally horizontally along the rear wall of the receptacle and said legs extending generally horizontally therefrom along the adjacent sides of the receptacle and through said apertures and thence extending downwardly along the webs and along the receptacle to and beyond the bottom edges of the sides of the receptacle and in converging relation with each other for insertion into the ground, the bottom converging ends of the legs causing the legs to engage and grip the opposite sides of the receptacle and securely hold the receptacle in an upright position, said legs being adapted to be sprung outwardly slightly to permit the receptacle to be manually tipped for emptying without removing the legs from the ground.

3. A rain gauge comprising an elongate upright open-topped receptacle having a pair of outwardly projecting rigid webs oriented in an upright position and respectively disposed at opposite sides of the receptacle, said webs having apertures spaced upwardly from the lower end of the receptacle and spaced outwardly from the sides of the receptacle, said apertures being substantially key-hole shaped and being oriented with the narrow slot portion extending in an upward direction from the enlarged portion, a mounting, including a generally U-shaped elongate resilient rod capable of limited flexing and having a pair of downwardly extending legs bearing snugly against the sides of the receptacle and having lower end portions disposed below the bottom of the receptacle and converging with respect to each other for projection into the ground for continuously urging the legs inwardly against the sides of the receptacle for tightly gripping the same, the upper terminal portions of said legs extending, in tight-fitting relation, horizontally through said apertures, and said rod also having an intermediate portion interconnecting the upper terminal end portions of said legs and lying against one side of the receptacle, said legs being adapted to be flexed slightly outwardly to relieve the gripping pressure on the receptacle and to permit the receptacle to be moved upwardly slightly to extract the upper terminal end portions of the legs from said slot portions of the apertures, whereby the receptacle is normally gripped and held in an upright position and may be tilted for emptying without removing the legs from the ground.

References Cited in the file of this patent
UNITED STATES PATENTS

| | | |
|---|---|---|
| 1,118,259 | Beard | Nov. 24, 1914 |
| 2,292,854 | Wilcox | Aug. 11, 1942 |
| 2,349,505 | Lohne | May 23, 1944 |
| 2,381,602 | Larson | Aug. 7, 1945 |